(No Model.)
W. S. BIGBY.
CYCLOMETER.
No. 541,452. Patented June 18, 1895.
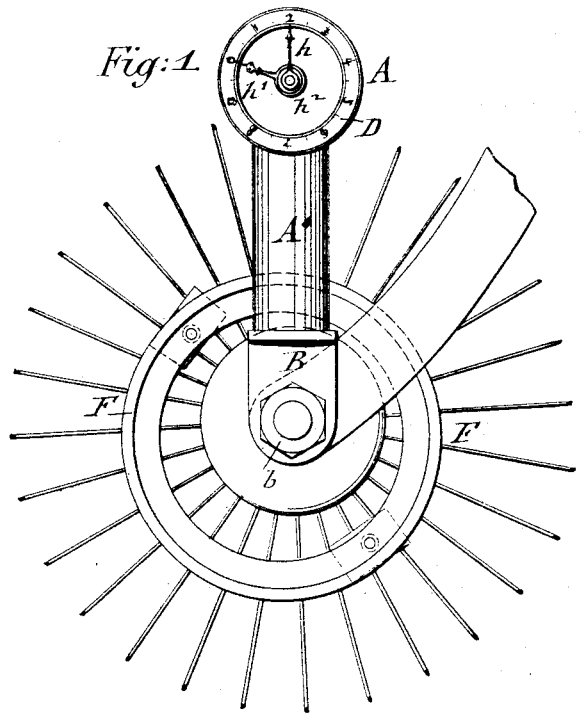
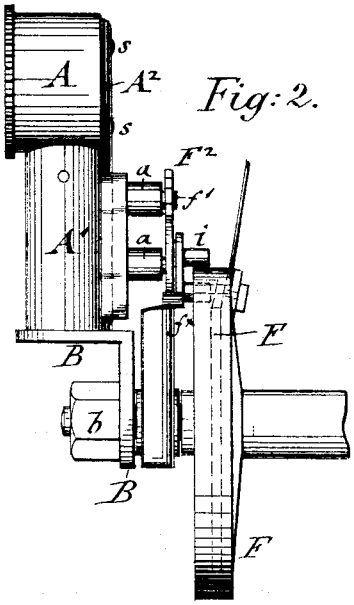
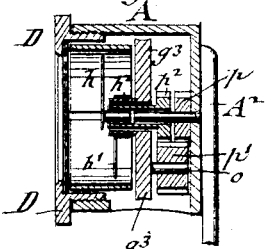
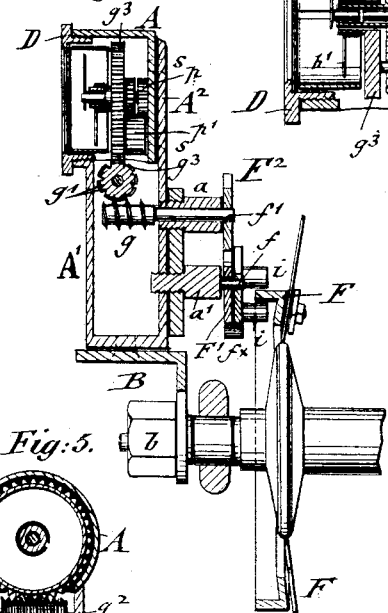
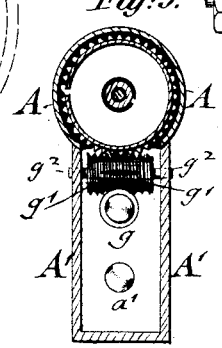
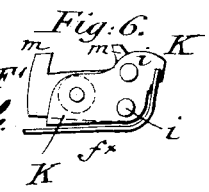
WITNESSES:
Juan C. Abel
Geo. S. Wheelock
INVENTOR
W. S. Bigby
BY
ATTORNEYS.
THE NORRIS PETERS CO., PHOTO-LITHO., WASHINGTON, D. C.

UNITED STATES PATENT OFFICE.

WILLIAM S. BIGBY, OF BROOKLYN, NEW YORK.

CYCLOMETER.

SPECIFICATION forming part of Letters Patent No. 541,452, dated June 18, 1895.

Application filed June 29, 1894. Serial No. 516,052. (No model.)

*To all whom it may concern:*

Be it known that I, WILLIAM S. BIGBY, a citizen of the United States, residing in Brooklyn, in the county of Kings and State of New York, have invented certain new and useful Improvements in Cyclometers, of which the following is a specification.

This invention has reference to certain improvements in devices for counting the rotations of shafts or axles, so as to determine either the speed at which the shaft or axle is rotated or the distance over which the shaft or axle has traveled; and the invention relates more particularly to an attachment for bicycles, by which the rotations of the axle are counted, and thereby the distance over which the bicycle has traveled registered. For this purpose my improved device is constructed in a comparatively small-size, and light and reliable manner so that the weight carried by the bicycle is not materially increased, and at any time the distance traveled can be readily determined, while the operating mechanisms of the device are incased so as to be protected as much as possible against dust and accidental injury.

The invention consists of a device for counting the rotations of a shaft or axle, which comprises a circular flange supported eccentrically to the shaft or axle, a pivoted actuating lever provided with pins that engage the said flange, an anchor-lever located on the shaft of the actuating lever and connected therewith by a suitable spring which engages the heel of the anchor-lever, a ratchet-wheel which is engaged by the teeth of the anchor-lever and a worm-wheel transmitting mechanism interposed between the shaft of the ratchet-wheel and the dial of the counting device for operating the hands, by which the number of rotations of the shaft or axle is indicated on the dial, said hands and transmitting-mechanism being arranged in a suitable casing and a hollow standard for supporting the said casing, which is located in proper proximity to the eccentric actuating flange.

The invention consists further of certain details of construction of my improved device for counting the rotations of the shaft or axle, which will be fully described hereinafter and finally pointed out in the claims.

In the accompanying drawings, Figure 1 represents a side view of my improved device for counting the rotations of a shaft or axle, shown as applied to the wheel of a bicycle. Fig. 2 is a side view of the device, showing part of the hub of the bicycle-wheel. Fig. 3 is a rear elevation of the same. Fig. 4 is a vertical transverse section of the counting device, showing the hub of the wheel in elevation, with some of the spokes. Fig. 4ᵃ is a vertical transverse section of the counting device, drawn on a somewhat larger scale. Fig. 5 is a vertical longitudinal section on line 5 5, Fig. 4; and Fig. 6 is a detailed side view of the anchor-lever and its oscillating actuating-lever.

Similar letters of reference indicate corresponding parts.

My improved device for counting the rotations of a shaft, axle or other rotating body is composed of three main parts: first, a circular flange which is applied eccentrically to the shaft or axle and connected in a stationary manner to the same either by means of a supporting ring that is attached by a suitable fastening device to the spokes of the bicycle wheel, or by means of a disk that is attached to the shaft, the rotations of which are to be counted; second, a suitable motion-transmitting mechanism by which the rotary motion of the eccentric flange is transmitted, which consists primarily of an actuating-lever provided with pins that engage said eccentric flange at both sides of same, an anchor-lever that is placed on the pivot of the actuating-lever and a ratchet-wheel engaged by the said lever; third, a counting-device which consists of a suitable worm-wheel transmission by which the intermittent rotary motion of the escapement-wheel is transmitted to the hands, which indicate the number of rotations of the shaft or axle on a suitable dial.

The transmitting and counting mechanisms are all inclosed in a suitable casing A, which is composed of a cylindrical portion for the dial, an upright tubular portion A' for supporting said dial-casing, and a laterally-extending sleeve *a* and post *a'* for the shafts of the ratchet-wheel and anchor-lever said casing and tubular portion inclosing the operating parts in such a way as to protect the same against injury and the entrance of dust. The lower end of the upright tubular portion A' is attached to a bracket-shaped support B which is attached by a nut $b$ to any stationary point of support relatively to the rotating shaft or axle, and in the case of a bicycle to the outer end of the axle. The position of the bracket B relatively to the eccentric flange F which rotates with the shaft or wheel has to be such that said flange can engage the projecting pins $i, i^8$ of the actuating-lever K and move freely between the same, the eccentricity of the flange F producing one oscillation of the actuating-lever and the ratchet-wheel for each full rotation of the shaft, axle or other rotating body.

The eccentric flange F is attached by suitable clamping devices to the spoke of the wheel or other rotating body and rotated between the pins of the actuating-lever which is pivoted to the outer end of the shaft $f$ of the anchor lever F'. The actuating-lever carries a flat spring $f^\times$ which is attached to one end of the same and extended below the actuating and anchor-levers, so that in case one of the pallets $m$ of the anchor-lever should strike the points of one of the teeth of the ratchet-wheel, the actuating-lever would give sufficiently by the pressure of the heel of the anchor-lever on its spring so that the breaking of the pallet or the teeth of the anchor-lever or ratchet-wheel is avoided, and thereby permanent injury to the counting-device prevented.

The shaft $f$ of the anchor-lever F' is attached to a stationary post $a'$ of the tubular supporting standard A', the anchor-lever being loosely placed on said shaft while the actuating-lever is pivoted loosely on the outer end of the shaft $f$ so as to turn freely thereon. The ratchet-wheel $F^2$ is keyed to a second shaft $f'$ which turns in bearings of the sleeve $a$ of the tubular supporting standard A', the inner end being provided with a worm $g$, which meshes with a compound worm-wheel $g'$, that is keyed to a shaft $g^2$ which is supported in bearings of the tubular standard A' at right angles to the axis of the shaft $f'$. The compound worm-wheel is composed of a fine helical thread that extends around the circumference of the worm-wheel and with transverse depressions which separate the worm-wheel into a number of teeth that engage with the worm-wheel on the shaft $f'$, so that rotary motion is transmitted to said worm-wheel $g'$.

The fine spiral threads of the worm-wheel $g'$ serve to engage with the toothed circumference of a larger worm-wheel $g^3$ the hub of which is supported on a fixed center pivot of the dial-casing A.

The cylindrical casing A is supported on an upwardly-extending lug $A^2$ of the tubular standard A', said lug being obtained by cutting off a portion of the tubular standard so as to fit the casing to the same, which is then fastened by screws $s$ to the extension of the tubular standard A'.

On the fixed center pivot of the casing A is placed a fixed pinion $p$ having eighteen teeth which meshes with a second pinion $p'$ the teeth of which are made of double width of the teeth of the pinion $p$, and which pinion is mounted on a pin $o$ eccentrically fixed on the large worm-wheel $g^3$ mounted on the center pivot of the casing A. The wider pinion $p'$ meshes again with a narrow pinion $p^2$ having twenty teeth that is attached to a sleeve which passes through the hub of the large worm-wheel $g^3$ and which sleeve carries at its front end the index-hand $h$ by which the number of revolutions are indicated. On the hub of the large worm-wheel $g^3$ is placed a second hand $h'$ by means of a split sleeve $h^2$, said hand indicating a fractional part of the distance indicated by the hand $h$. The rotations of the worm-wheel $g^3$ are transmitted by the wide pinion $p'$ which gradually turns around the fixed pinion $p$ on the stationary pivot of the casing A to the pinion $p^2$ on the sleeve of the index-hand $h$ so as to impart thereby motion to the latter. The motion of the worm-wheel is indicated by the index-hand $h'$, the worm-wheel $g^3$ forming with the stationary pinion $p$, the wider pinion $p'$ and the pinion $p^2$ on the hub of the index-hand $h$, a so-called planetary motion by which at every ten revolutions of the index-hand $h'$ the index-hand $h$ is moved for one revolution on the dial, and this proportion of ten to one is brought about by reason of the fact that the movable pinion $p^2$ has twenty teeth, and the fixed pinion $p$ has eighteen teeth.

The casing A is provided with an interior screw-thread into which is screwed a dial-ring D, which is provided with a threaded collar and with a transparent front formed of glass, mica or other suitable material which is held in position in the dial-ring D by means of a split-ring that is sprung into the threaded collar of the dial-ring, said ring being of such width as to hold the large worm-wheel $g^3$ in its proper relative position to the transmitting gear-wheel so that when the dial-ring is screwed home into the casing the worm-wheel is retained on the center pivot of the casing A. The dial-ring is provided on its face with suitable graduations, which are suitably numbered and which indicate either miles and sub-divisions of the same or multiples of the rotations of the shaft or other rotary body, the rotations of which are to be counted.

My improved device for counting the rotations of a shaft-wheel or other rotating body is used in the following manner: After the supporting-bracket is attached in relative position to the shaft, wheel or other rotating body, the eccentric flange F is adjusted relatively to the axis of the shaft or hub of the wheel. As soon as the shaft or wheel is set in motion, each rotation of the same imparts an oscillating motion to the actuating-lever K and to the anchor-lever F', so that the pallets $m, m$ of the latter engage the teeth of the ratchet-wheel $F^2$, each rocking or oscillating motion of the actuating- and anchor-levers producing the turning of the ratchet-wheel for the distance of one tooth. The intermittent rotary motion imparted to the shaft of the ratchet-wheel is transmitted by the worm $g$ and compound worm-wheel $g'$ to the large worm-wheel $g^3$ located in the dial-casing A, so that the index-hand $h'$ which is applied to the hub of the large worm-wheel $g^3$ turns with the same and indicates thereby a certain number of rotations of the shaft or wheel. By the planetary motion hereinbefore described, the motion is transmitted to the second index-hand $h$.

When the counting-device is applied to a bicycle, the transmitting gearing is so arranged in proportion to the diameter of the wheel of the bicycle that the large worm-wheel $g^3$ is moved for one-tenth of its full rotation when the wheel of the bicycle has been rotated so as to travel one mile. At the same time, the index-hand $h$ is moved through one-tenth of the distance for which the large gear-wheel has been moved, so as to indicate full miles on the dial of the counter.

In case the device is used for counting the rotation of shafts, the dial is graduated so as to count, say, hundreds and multiples of hundreds of the rotations of the shaft.

My improved device for rotating shafts, bicycle-wheels, &c., can be made in comparatively small and compact size so that it can be applied without difficulty in proximity to any body, the rotations of which are to be counted. The smallness and lightness of the same are of especial advantage in bicycles, in which it is necessary to avoid all unnecessary weight. The dial can be arranged either in vertical position or the dial and its casing can be arranged in horizontal position on top of the tubular supporting standard casing, in which latter case the distance traveled can be read off by looking down on the dial, which may be preferred by some cyclists. As all the operating parts with the exception of the eccentric flange and the actuating-lever, anchor-lever and ratchet-wheel are inclosed they are not liable to be injured in case of accidents, while the outside parts can be readily cleaned, as they are easily accessible. The counting device forms, therefore, a very convenient and effective attachment for bicycles and other vehicles.

Having thus described my invention, I claim as new and desire to secure by Letters Patent—

1. The combination, with a shaft, wheel or other rotatory body, a circular flange arranged eccentrically at the axis of said body, a counting-device applied to a stationary support in proximity to said rotatory body, a worm-wheel transmission for actuating the counting-device, a ratchet-wheel on the shaft of the worm-wheel, an oscillating anchor-lever, the pallets of which engage said ratchet-wheel a pivoted actuating-lever, provided with projecting pins for engaging said eccentric flange, and a spring projecting from the actuating-lever under the anchor-lever, whereby the anchor-lever is resiliently held, substantially as set forth.

2. The combination, with a shaft, wheel or other rotatory body, a circular flange attached to said body eccentrically to the axis of the same, a counting-device, a tubular standard for supporting said counting-device, said standard being applied by a stationary support relatively to the rotating flange, a worm-wheel transmission supported in bearings of said standard, a ratchet-wheel attached to the shaft of one of the worm-wheels, an anchor-lever, the pallets of which engage the ratchet-wheel and an actuating-lever placed loosely on the pivot of the anchor-lever and provided with pins for engaging said actuating eccentric flange, substantially as set forth.

3. The combination, with a shaft, wheel or other rotatory body, a circular flange attached eccentrically to the axis of said body, a counting-device, a tubular standard for supporting said counting-device, a stationary support for said standard, a worm-wheel transmission, composed of a primary worm, an intermediate double worm-wheel and a transmitting worm-wheel located in the counting-device, a ratchet-wheel on the shaft of the primary worm, an anchor-lever for said ratchet-wheel, and an actuating-lever pivoted to the anchor-lever and provided with projecting pins for engaging the eccentric flange, substantially as set forth.

4. The combination, with a shaft, wheel, or other rotatory body, a circular flange attached eccentrically to the axis of said body, a counting-device supported stationary relatively to the rotatory body, an actuating mechanism for transmitting the rotations of the eccentric flange, a worm-wheel mechanism operated by said actuating-mechanism, two index-hands, said worm-wheel mechanism being adapted to operate one of the index-hands of the counting-device, and the planetary gear-wheels actuated by the worm-wheel mechanism and adapted to transmit motion to the second index-hand of the counting-device, substantially as set forth.

In testimony that I claim the foregoing as my invention I have signed my name in presence of two subscribing witnesses.

W. S. BIGBY.

Witnesses:
PAUL GOEPEL,
K. R. BRENNAN.